(12) United States Patent
Venkataramanan et al.

(10) Patent No.: US 11,336,694 B2
(45) Date of Patent: May 17, 2022

(54) SCALABLE SECURITY POLICY ARCHITECTURE WITH SEGREGATED FORWARDING AND SECURITY PLANE AND HIERARCHICAL CLASSES

(71) Applicant: Cisco Technology, Inc., San Jose, CA (US)

(72) Inventors: Gautam Venkataramanan, Dublin, CA (US); Umamaheswararao Karyampudi, Fremont, CA (US); Murukanandam K. Panchalingam, Dublin, CA (US); Ajay K. Modi, San Jose, CA (US); Maurizio Portolani, Zug (CH)

(73) Assignee: Cisco Technology, Inc., San Jose, CA (US)

( * ) Notice: Subject to any disclaimer, the term of this patent is extended or adjusted under 35 U.S.C. 154(b) by 329 days.

(21) Appl. No.: 16/532,385

(22) Filed: Aug. 5, 2019

(65) Prior Publication Data

US 2021/0044622 A1 Feb. 11, 2021

(51) Int. Cl.
*G06F 17/30* (2006.01)
*H04L 29/06* (2006.01)
(Continued)

(52) U.S. Cl.
CPC .......... *H04L 63/20* (2013.01); *H04L 41/0803* (2013.01); *H04L 41/0813* (2013.01); *H04L 41/0893* (2013.01)

(58) Field of Classification Search
CPC . H04L 63/20; H04L 12/4641; H04L 63/0227; H04L 63/0218
(Continued)

(56) References Cited

U.S. PATENT DOCUMENTS 10,158,674 B2 * 12/2018 Johnson .............. H04L 41/0893
2003/0065944 A1 * 4/2003 Mao ....................... H04L 63/04
726/25
(Continued)

FOREIGN PATENT DOCUMENTS

WO 2016130108 A1 8/2016

OTHER PUBLICATIONS

Jody, "Network Centric to ACI Centric Migration," Sep. 8, 2017, 10 pages [unofficialaciguide.com].
(Continued)

*Primary Examiner* — Umar Cheema
*Assistant Examiner* — Tesfu N Mekonen
(74) *Attorney, Agent, or Firm* — Patterson + Sheridan, LLP (57) ABSTRACT

Techniques for hierarchical security policies are disclosed. A first network configuration is received, where the first network configuration includes a plurality of subnets and a plurality of security zones. An updated network configuration is generated based on the first network configuration by generating, for a first security zone of the plurality of security zones, a first master class, and generating, for each respective subnet of the plurality of subnets, a respective bridge domain. For each respective bridge domain, a respective local endpoint group (EPG) corresponding to the first security zone is created, and the first master class is assigned to the respective local EPG. Finally, one or more contracts are generated for the first master class based on the first network configuration.

20 Claims, 7 Drawing Sheets

(51) Int. Cl.
  *H04L 41/0893*  (2022.01)
  *H04L 41/0803*  (2022.01)
  *H04L 41/0813*  (2022.01)

(58) Field of Classification Search
  USPC .......................................................... 709/3
  See application file for complete search history.

(56) References Cited

U.S. PATENT DOCUMENTS

2004/0160903 A1* 8/2004 Gai .................. H04L 63/105
                                              370/254
2010/0071024 A1* 3/2010 Eyada ............... H04L 63/1458
                                              726/1
2012/0185913 A1* 7/2012 Martinez ............ H04L 12/66
                                              726/1
2017/0288952 A1* 10/2017 Clark ............... H04L 41/0672
2018/0367541 A1  12/2018 Ponnuswamy et al.

OTHER PUBLICATIONS

Cisco, "Migrating Existing Networks to Cisco ACI," Apr. 23, 2019, 30 pages [cisco.com].

* cited by examiner

SCALABLE SECURITY POLICY ARCHITECTURE WITH SEGREGATED FORWARDING AND SECURITY PLANE AND HIERARCHICAL CLASSES

TECHNICAL FIELD

Embodiments presented in this disclosure generally relate to network security policies. More specifically, embodiments disclosed herein relate to inheritable security classes that provide scalable architecture.

BACKGROUND

Traditional data center networks often include multiple subnets and multiple switch virtual interfaces (SVIs) to connect the various components of the network. In some systems, access control lists (ACLs) are deployed based on the Internet Protocol (IP) addresses of the relevant components, in order to enforce security policies and segregate the components. When migrating to a software-controlled network (SDN), these policies and configurations must be maintained in order to ensure the updated network performs as expected. This includes ensuring flood domain(s) remain the same, as well as that communications policies are preserved to allow components to interoperate as intended. However, due to the structure of existing networks and the architecture of SDNs, this migration process frequently requires creation of a large number of contracts or policies. This burdens the controller(s) and degrades performance.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to one embodiment presented in this disclosure, a method is provided. The method includes receiving a first network configuration, wherein the first network configuration includes a plurality of subnets and a plurality of security zones. The method further includes generating an updated network configuration based on the first network configuration by generating, for a first security zone of the plurality of security zones, a first master class, and generating, for each respective subnet of the plurality of subnets, a respective bridge domain. Additionally, the method includes, for each respective bridge domain, creating a respective local endpoint group (EPG) corresponding to the first security zone, and assigning, to the respective local EPG, the first master class. Finally, the method includes generating one or more contracts for the first master class based on the first network configuration.

According to a second embodiment presented in this disclosure, a non-transitory computer-readable storage medium is provided. The non-transitory computer-readable storage medium has computer-readable program code embodied therewith, which is executable by one or more computer processors to perform an operation. The operation includes receiving a first network configuration, wherein the first network configuration includes a plurality of subnets and a plurality of security zones. The operation further includes generating an updated network configuration based on the first network configuration by generating, for a first security zone of the plurality of security zones, a first master class, and generating, for each respective subnet of the plurality of subnets, a respective bridge domain. Additionally, the operation includes, for each respective bridge domain, creating a respective local endpoint group (EPG) corresponding to the first security zone, and assigning, to the respective local EPG, the first master class. Finally, the operation includes generating one or more contracts for the first master class based on the first network configuration.

According to a third embodiment presented in this disclosure, a system is provided. The system includes one or more computer processors, and a memory containing a program which, when executed by the one or more computer processors, performs an operation. The operation includes receiving a first network configuration, wherein the first network configuration includes a plurality of subnets and a plurality of security zones. The operation further includes generating an updated network configuration based on the first network configuration by generating, for a first security zone of the plurality of security zones, a first master class, and generating, for each respective subnet of the plurality of subnets, a respective bridge domain. Additionally, the operation includes, for each respective bridge domain, creating a respective local endpoint group (EPG) corresponding to the first security zone, and assigning, to the respective local EPG, the first master class. Finally, the operation includes generating one or more contracts for the first master class based on the first network configuration.

Example Embodiments

Embodiments of the present disclosure provide techniques to implement hierarchical security policies in an efficient manner that reduces the number of contracts needed. Some embodiments of the present disclosure provide techniques to efficiently migrate traditional networks to an SDN system. In other embodiments, techniques are provided to deploy new networks using hierarchical systems that improve efficiency. In one embodiment, master endpoint groups (EPGs) are created for each application or security zone in the traditional configuration. In the case of a new deployment, a master EPG can be created for each security zone to be included in the new configuration. Local EPGs within each bridge domain or subnet can then inherit from these master classes, in order to enforce broader policies without requiring a large number of contracts, as discussed in more detail below. Further, in some embodiments, narrower security policies can be enforced between local EPGs by applying unique local classes to each group. In some embodiments, the applicable contracts or policies for a given source or destination node are defined by the EPG to which it belongs. This class (also referred to as the EPG, "s class", or "security tag") is defined in a set of bits associated with the node. In one embodiment, one or more of the most-significant bits (MSBs) of this class are used to identify the relevant master class, while one or more of the least-significant bits (LSBs) are used to define the local class.

Figure 1:
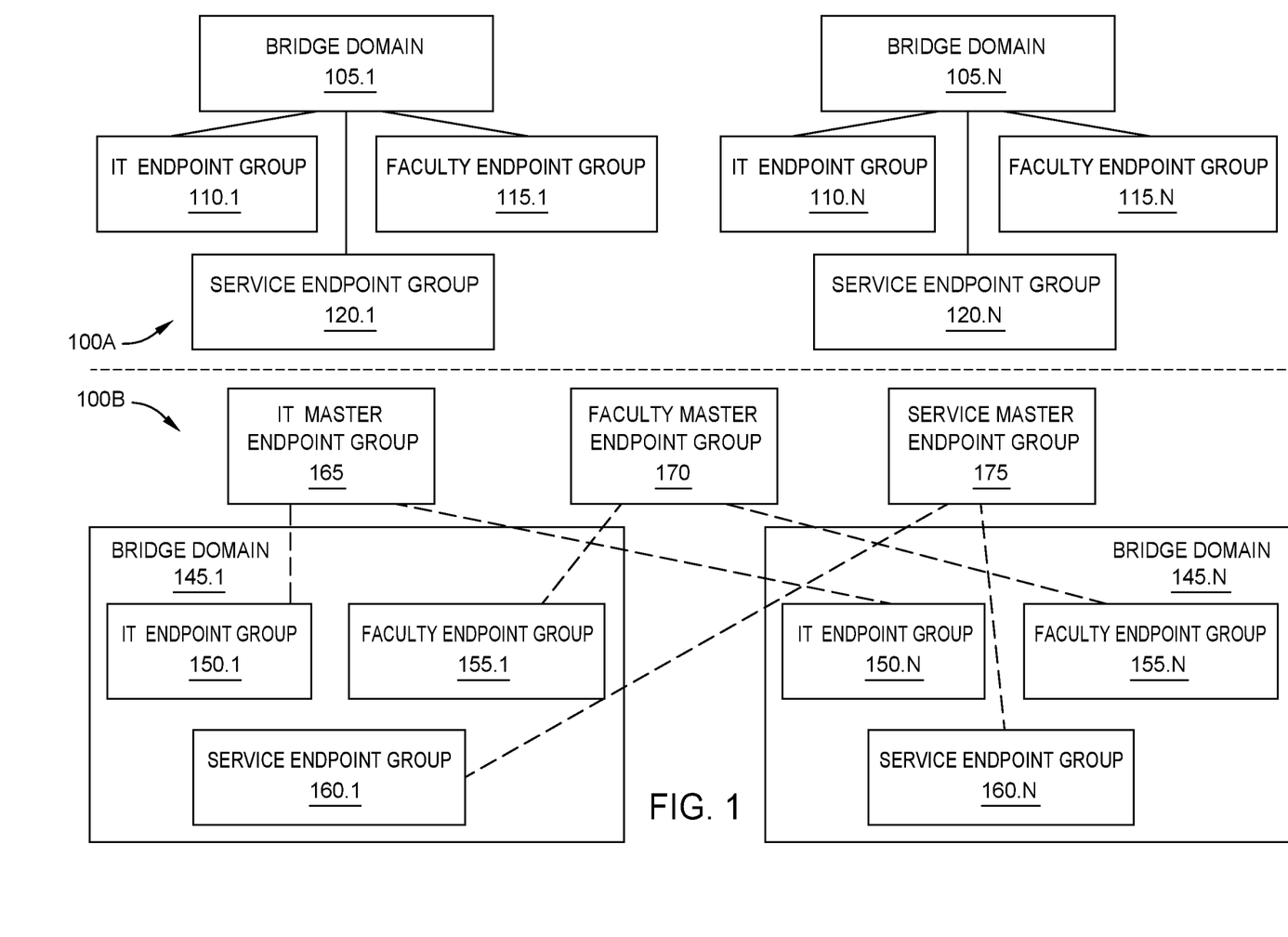
FIG. 1 illustrates network configurations configured to enforce security policies, according to one embodiment disclosed herein.

FIG. 1 illustrates Network Configurations 100A-B configured to enforce security policies, according to one embodiment disclosed herein. In the illustrated embodiment, the Network Configuration 100A uses ordinary EPG definitions, while the Network Configuration 100B utilizes a hierarchical system that improves scalability. In some embodiments, to migrate a network configuration to an SDN system, each subnet or SVI in the traditional configuration is converted to a respective bridge domain in the updated configuration. This ensures that the flood domain(s) present in the traditional configuration are maintained. In embodiments, the traditional configuration can include any number of subnets and/or virtual local area networks (VLANs) across any number of switches and/or SVIs. Although some examples used herein refer to migration from a traditional network configuration, embodiments of the present disclosure are readily-applicable to new deployments as well, as understood by one of ordinary skill in the art.

Further, the traditional network can include any number of applications and/or security zones. In an embodiment, a security zone refers to a set of application(s), or instances of the same application, that share common security policies. For example, a "services" application or zone may exist for applications and workloads related to services, an "IT" application or zone can exist for components related to information technology, and the like. In an embodiment, these application(s) can span across any number of subnets. That is, in the traditional (un-migrated) network configuration, there may be IT applications in any number of subnets, with similar or identical security policies being applied for each IT application in the disparate subnets.

In the illustrated Network Configuration 100A, a Bridge Domain 105 with one subnet/flood domain has been created for each subnet in the original network configuration. That is, the Bridge Domain 105.1 corresponds to a first subnet, and the Bridge Domain 105.N corresponds to a second. Although two Bridge Domains 105 are depicted, in embodiments, there may of course be any number of subnets/Bridge Domains 105. In an embodiment, the policies or contracts applied to a given node are defined in the ACI fabric based on the EPG to which the node belongs, as indicated by its security tag. Thus, because a given application/security zone may span multiple subnets, a corresponding EPG must be created within each Bridge Domain 105, in order to create and enforce security policies. In the illustrated embodiment, the traditional configuration included three applications/security zones: an IT group, a Faculty group, and a Service group. Thus, as depicted, the Bridge Domain 105.1 includes an IT Endpoint Group 110.1, a Faculty Endpoint Group 115.1, and a Service Endpoint Group 120.1.

In one embodiment, each of these local EPGs (e.g., the IT Endpoint Group 110.1, the Faculty Endpoint Group 115.1, and the Service Endpoint Group 120.1) is implemented using a respective VLAN within the Bridge Domain 105.1. In such an embodiment, the relevant nodes/components/applications are assigned to the corresponding VLAN. That is, all IT components that belong to the subnet corresponding to the Bridge Domain 105.1 are assigned to the VLAN that corresponds to the IT Endpoint Group 110.1. This enables them to interact within their local group.

In the illustrated embodiment, the Bridge Domain 105.N similarly includes corresponding local EPGs for each security zone: an IT Endpoint Group 110.N, a Faculty Endpoint Group 115.N, and a Service Endpoint Group 120.N. To implement the policies of the original network, the Network Configuration 100A may require a large number of contracts. For example, if communication should be enabled across any nodes belonging to the IT security zone (regardless of subnet), contracts must be established between each pair of Bridge Domains 105. That is, a respective contract is needed for communications from the IT Endpoint Group 110.1 in the Bridge Domain 105.1 to each other IT Endpoint Group 110 in each other Bridge Domain 105. As the number of subnets grows, the number of required policies therefore grows exponentially.

That is, a first contract is required to enable communication from the first bridge domain to the second bridge domain, a second contract for communications from the first to the third bridge domain, and so on. Further, a contract is required for communications from the second to the first, from the second to the third, and so on. Thus, in the Network Configuration 100A, for n bridge domains, the number of required policies to implement full mesh communication between applications within a given security zone is $n*(n-1)$, or $n^2-n$. For a Network Configuration 100A that includes ten subnets, ninety contracts are required for each security zone. Thus, if three applications/security zones exist, two hundred seventy contracts are needed. If the architecture includes one hundred subnets, nine thousand nine hundred contracts are required for each security zone (a total of twenty-nine thousand, seven hundred contracts for three security zones). In addition to this mesh communication, in some embodiments, separate policies/contracts are used to implement specific filters or policies between particular source/destination nodes and/or ports.

In the illustrated embodiment, the Network Configuration 100B utilizes hierarchical classes to improve scalability and reduce controller overhead. As illustrated, a separate Bridge Domain 145 is created for each subnet in the original configuration, and local EPGs/VLANs are established for each security zone/application, within each Bridge Domain 145. Thus, the Bridge Domain 145.1 includes a local IT Endpoint Group 150.1, Faculty Endpoint Group 155.1, and Service Endpoint Group 160.1. Similarly, the Bridge Domain 145.N includes a local IT Endpoint Group 150.N, Faculty Endpoint Group 155.N, and Service Endpoint Group 160.N. As discussed above, although two Bridge Domains 145 are depicted, there may of course be any number of subnets/Bridge Domains 145 in a given implementation.

As illustrated, the Network Configuration 100B includes a master class for each application/security zone. That is, during migration, a separate master class is created for each application/security zone, in addition to creating local classes within each Bridge Domain 145. In the illustrated embodiment, an IT Master Endpoint Group 165 is created for the IT application/security zone, a Faculty Master Endpoint Group 170 is created for the faculty application/security zone, and a Service Master Endpoint Group 175 is created for the service application/security zone. As depicted by the dashed lines, each local endpoint group inherits security classifications from its respective master class. For example, the IT Endpoint Groups 150.1 through 150.N each inherit policies from the IT Master Endpoint Group 165, the Faculty Endpoint Groups 155.1 through 155.N each inherit policies from the Faculty Master Endpoint Group 170, and the Service Endpoint Groups 160.1 through 160.N each inherit policies from the Service Master Endpoint Group 175.

In an embodiment, if the Network Configuration 100B should include mesh communication across any nodes belonging to a given security zone, a single contract is used for each application/security zone, regardless of the number of Bridge Domains 145. That is, because each node/component can inherit the policies of its corresponding master class, a single contract is used to enable connectivity between any nodes that correspond to that master class, across any number of Bridge Domains 145. This greatly reduces the number of contracts needed to migrate the configuration, and dramatically improves scalability. In addition to this mesh communication, separate policies/contracts are required to implement specific filters between particular source/destination nodes and/or ports. In some embodiments, each local group corresponds to a unique local EPG that can be used to implement these granular policies, as discussed in more detail below.

Figure 2:
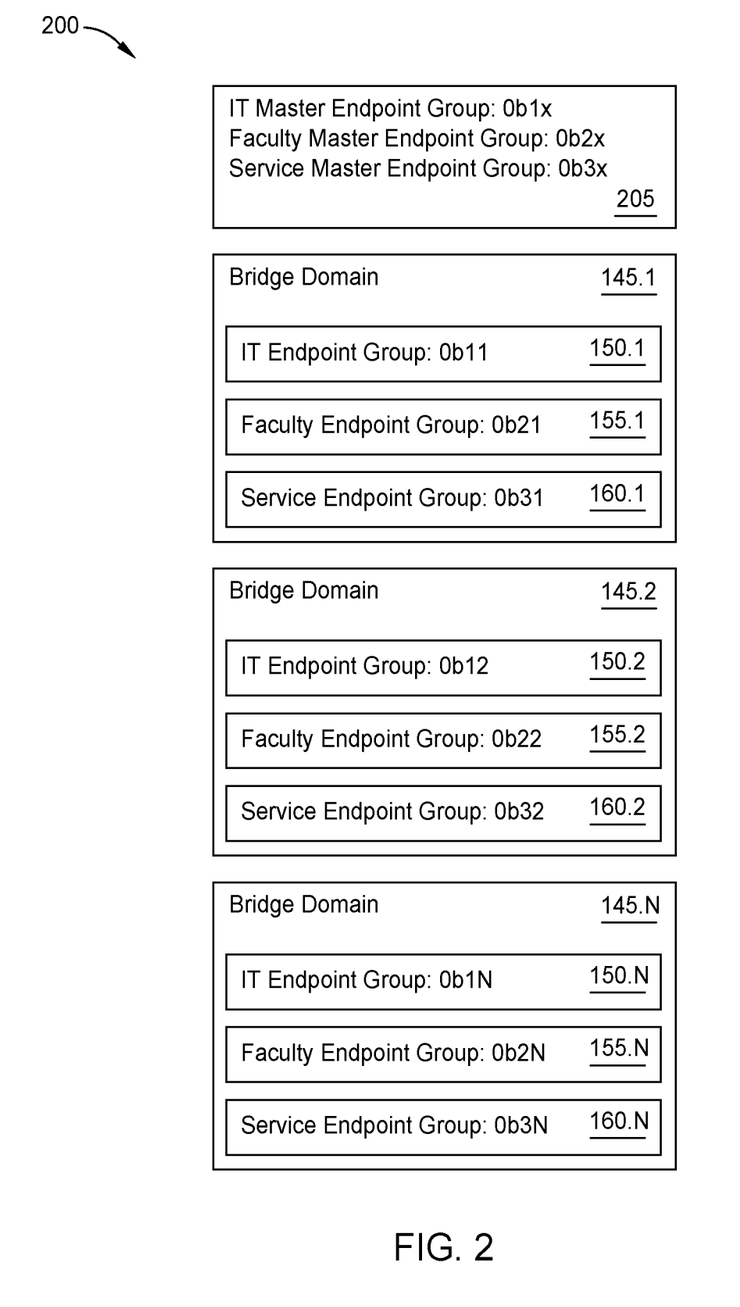
FIG. 2 depicts master and local endpoint group classes that enable hierarchical security policies, according to one embodiment disclosed herein.

FIG. 2 depicts master and local endpoint group classes that enable hierarchical security policies, according to one embodiment disclosed herein. In the illustrated embodiment, each security tag is defined as a set of two bytes (e.g., sixteen bits). In embodiments, the security tag may generally be any length, depending on the particular architecture and implementation. In an embodiment, the security tags associated with a given source and/or destination node are used to identify relevant policies or contracts for the communication. For example, when a communication is received by a network node (such as a router, switch, or other component) the source and/or destination EPGs can be identified, and these tags can be used to lookup the applicable security policies.

In the illustrated embodiment, the set of Master EPGs 205 includes an IT Master Endpoint Group, a Faculty Master Endpoint Group, and a Service Master Endpoint Group. In one embodiment, the relevant master class for a given node is identified based on one or more MSBs (i.e., the left-most bits) of it security tag. As illustrated, the IT Master Endpoint Group includes any security tags that have a value of "1" in its eight MSBs (e.g., in the first byte of the tag), with any value for the second byte. Similarly, the Faculty Master Endpoint Group includes any security tags that have "2" in its eight MSBs, and the Service Master Endpoint Group includes any security tags that have "3" in its eight MSBs. In the illustrated embodiment, as depicted by the "X," the eight LSBs (the second byte of the security tag) are not relevant in determining the appropriate master class. Although the illustrated embodiment uses one byte to identify the master class and one byte to identify the local class, any division can be used, depending on the particular implementation. For example, the master class could use ten bits while the local class uses six, the master class could utilize five bits while the local class utilizes eleven, and so on. Further, in some embodiments, there may be one or more unused bits in the security tag. Additionally, in one embodiment, one or more intermediate bites are used to define a third class in the hierarchy, as discussed below in more detail.

As illustrated, each local endpoint group includes the MSBs corresponding to its associated master class in order to inherit policies applied to the master class. For example, each IT Endpoint Group 150.1-N has "1" as its most significant byte (the eight most significant bits), each Faculty Endpoint Group 155.1-N has "2" as its eight MSBs, and each Service Endpoint Group 160.1-N has "3" as its eight MSBs. In this way, when a communication is received, the eight MSBs of the source and/or destination can be used to identify the corresponding master class(es), and the relevant master contracts. For example, if a node belonging to the IT Endpoint Group 150.1 in the Bridge Domain 145.1 attempts to send a packet to the IT Endpoint Group 150.2 in the Bridge Domain 145.2, it can be determined that the source and destination both belong to the IT Master Endpoint Group, and any master contracts that apply to the IT Master Endpoint Group can be identified and applied.

In some embodiments, to enable granular policies between particular groups, nodes, or ports, one or more LSBs of the security tag are used to define the local group. For example, as illustrated, the IT Endpoint Group 150.1 in the Bridge Domain 145.1 uses "1" as the value for the least significant byte, while the IT Endpoint Group 150.2 in the Bridge Domain 145.2 uses "2." In this way, each local group has a unique security tag that includes a combination of a master class and a local class. This enables policies to be enforced based on the particular local group, in addition to the master class. For example, in addition to identifying the relevant master classes and policies, the system can identify the corresponding local classes and policies.

In some embodiments, if a local policy and a master policy conflict, the local policy controls. For example, suppose a first (master) contract enables communications between all nodes with "1" in the MSBs, while a second (local) contract disallows communication between nodes with "1" and "2" in their LSBs. In an embodiment, if a node in the IT Endpoint Group 150.1 attempts to transmit a communication to a node in the IT Endpoint Group 150.2, the system can identify both rules as relevant. That is, the first contract is applicable because both nodes have "1" as the eight MSBs of their security tags, and the second contract is relevant because the first node has "1" as its eight LSBs, and the second has "2" as its eight LSBs. In such an embodiment, because the local policies control over conflicting master policies, the system can filter the communication based on the second contract, and refrain from applying the first.

Thus, embodiments of the present disclosure provide for hierarchical security classes by dividing the security tag(s) into separate sections. In the illustrated embodiment, two levels are present in the hierarchy (a master class and a slave or local class). In some embodiments, there may be fewer (e.g., only master classes), or more. For example, in one embodiment, the system utilizes one or more MSBs to define the master class, one or more LSBs to define the local class, and one or more intermediate bits to define a middle class. In this way, hierarchies can be built to enable granular control of the network, while minimizing the number of contracts required to implement the desired security policies.

Figure 3:
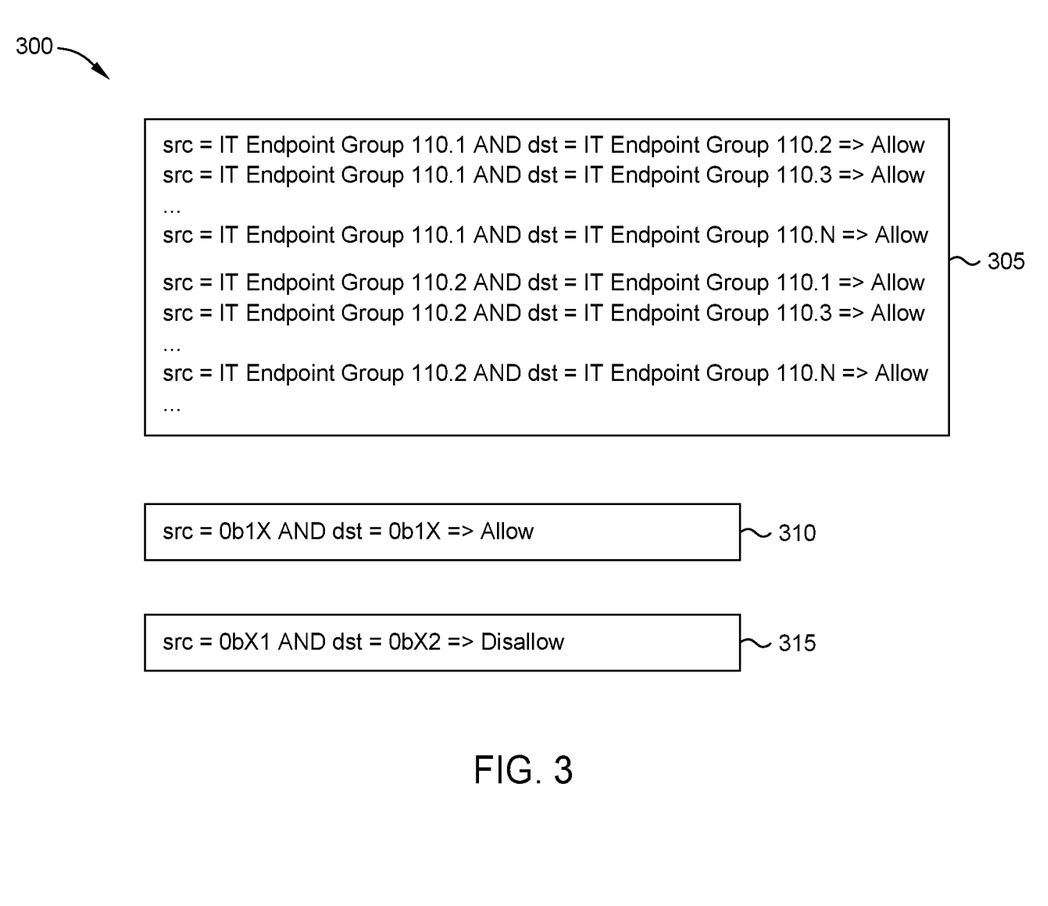
FIG. 3 depicts a set of contracts needed to enforce security policies in various network architectures, according to one embodiment disclosed herein.

FIG. 3 depicts a set of contracts needed to enforce security policies in various network architectures, according to one embodiment disclosed herein. In the illustrated embodiment, the set of Contracts 305 are used to enable mesh communication between all nodes in the belonging to the IT security zone of the Network Configuration 100A. That is, the Contracts 305 do not utilize hierarchical contracts. In contrast, the Contracts 310 utilize the hierarchical policies described herein to implement the same mesh communications, which improves scalability and reduce overhead for the SDN controller(s). In the illustrated embodiment, the Contracts 305 include a number of separate policies, one for each pair of Bridge Domains 105. As illustrated, this includes a first policy to enable communications from the IT Endpoint Group 110.1 to the IT Endpoint Group 110.2, a second policy to enable communications from IT Endpoint Group 110.1 to IT Endpoint Group 110.3, and so on. Further, as illustrated, separate contracts are required to allow interaction from IT Endpoint Group 110.2 back to IT Endpoint Group 110.1, from IT Endpoint Group 110.2 to IT Endpoint Group 110.3, and so on. Thus, the Contracts 305 require a large number of policies to implement mesh interactivity for the IT security zone.

The Contracts 310, however, need only a single contract for each security zone. As illustrated, this policy specifies that interactivity is enabled for any communications associated with a source security tag with "1" in the MSBs, and a destination security tag of "1" in the MSBs. In some embodiments, rather than specifying "1X," contracts applicable to master classes can simply specify the master class (e.g., "1"), and need not specify any value for the bits that define the local class. In the illustrated embodiment, the Contracts 315 correspond to local policies that are applied on a more granular basis. As illustrated, these include a contract that nodes belonging to a local class of "1" (e.g., the Bridge Domain 145.1) cannot transmit packets to nodes in the local class "2" (e.g., Bridge Domain 145.2), regardless of their master classes. In an embodiment, this local class is given priority over any master classes. Thus, in the illustrated embodiment, the IT Endpoint Group 150.1 can transmit packets to the IT Endpoint Group 150.N, but not to the IT Endpoint Group 150.2.

In some embodiments, in addition to master contracts that apply based on the relevant master class(es) (e.g., based on the MSBs) and local contracts that are applicable based on the relevant local class(es) (e.g., based on the LSBs), there may also be hybrid contracts that specify both master and local classes. For example, a contract can allow or disallow communications between source tag 0b11 and destination tag 0b22. In an embodiment, more specific or granular contracts are given priority over more generic or high-level contracts. As used herein, contract priority indicates which contract controls if two contracts are in conflict. That is, if two conflicting policies are identified based on the class(es), the policy with the highest priority is applied, and the lower priority rules are ignored. For example, a contract that specifies both a master and a local class may be given priority over one that only specifies a local class, which similarly has priority over one that specifies only a master class. In this way, granular contracts can be defined to enable scalable and efficient security control in the updated network configuration.

Figure 4:
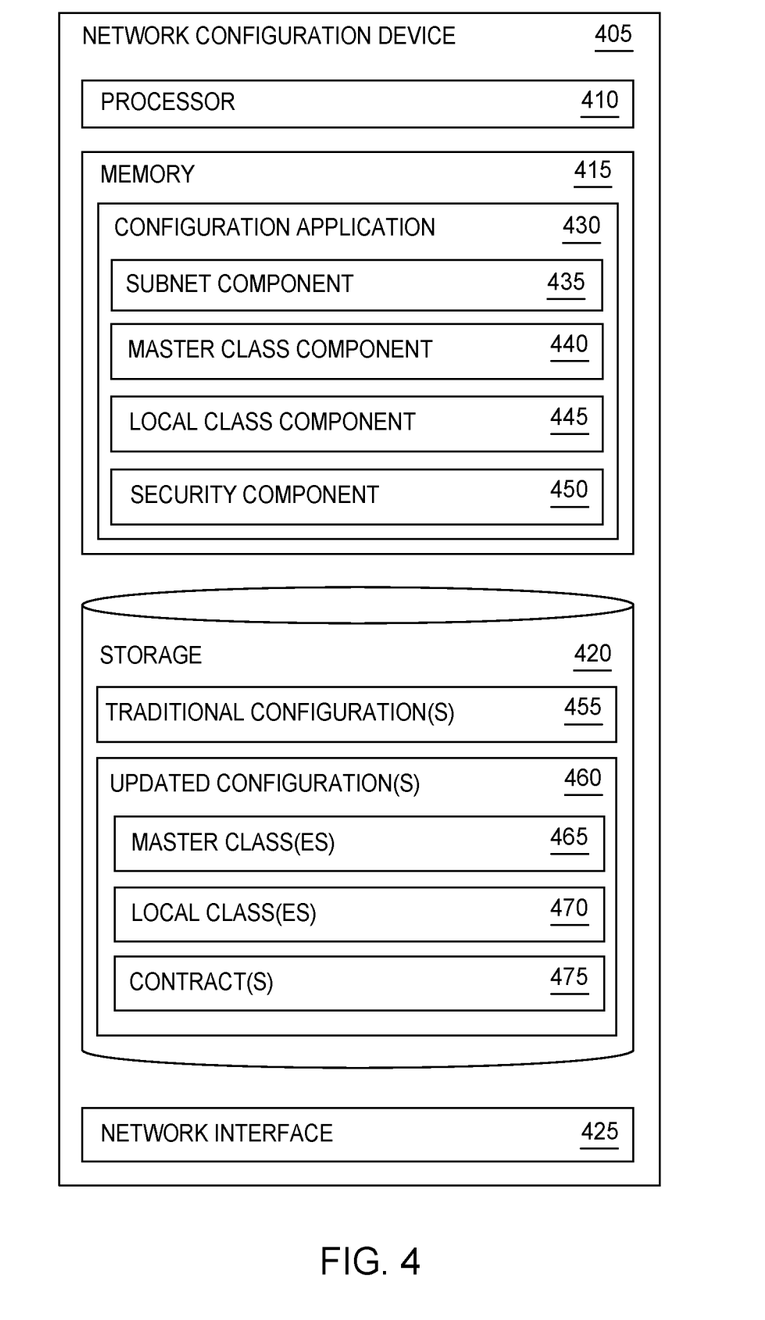
FIG. 4 is a block diagram illustrating a network configuration device, according to one embodiment disclosed herein.

FIG. 4 is a block diagram illustrating a Network Configuration Device 405, according to one embodiment disclosed herein. As illustrated, the Network Configuration Device 405 includes a Processor 410, a Memory 415, Storage 420, and a Network Interface 425. In the illustrated embodiment, Processor 410 retrieves and executes programming instructions stored in Memory 415 as well as stores and retrieves application data residing in Storage 420. Processor 410 is representative of a single CPU, multiple CPUs, a single CPU having multiple processing cores, and the like. Memory 415 is generally included to be representative of a random access memory. Storage 420 may be a disk drive or flash-based storage device, and may include fixed and/or removable storage devices, such as fixed disk drives, removable memory cards, or optical storage, network attached storage (NAS), or storage area network (SAN). Via the Network Interface 425, the Network Configuration Device 405 can be communicatively coupled with one or more other devices including devices used by administrators, other network devices, and the like. In one embodiment, the Network Configuration Device 405 is an SDN controller. Although illustrated as a physical device, in embodiments, the functionality of the Network Configuration Device 405 can be implemented using hardware, software, or a combination of hardware and software.

In the illustrated embodiment, the Storage 420 includes one or more Traditional Configurations 455, and one or more Updated Configurations 460. In an embodiment, each Traditional Configuration 455 corresponds to a traditional network architecture with one or more subnets, SVIs, applications/security zones, and the like. Further, each Updated Configuration 460 corresponds to a Traditional Configuration 455 that has been migrated to an SDN system, such as an Application Centric Infrastructure (ACI) fabric. As illustrated, each Updated Configuration 460 includes one or more Master Classes 465, one or more Local Classes 470, and one or more Contracts 475. In an embodiment, as discussed above, each Master Class 465 corresponds to a particular application or security zone in the Traditional Configuration 455, and each Local Class 470 corresponds to an application/security zone within a particular subnet/bridge domain. Further, the Contracts 475 define the security policies that control the network. Although illustrated as residing in Storage 420, in embodiments, the Traditional Configuration(s) 455 and Updated Configuration(s) 460 may reside in any suitable location.

As illustrated, the Memory 415 includes a Configuration Application 430, which is used to migrate and deploy network configurations in the SDN system. The Configuration Application 430 includes a Subnet Component 435, a Master Class Component 440, a Local Class Component 445, and a Security Component 450. Although depicted as discrete components for clarity, in embodiments, the operations of the Subnet Component 435, Master Class Component 440, Local Class Component 445, and Security Component 450 may be combined or distributed across any number of components.

In an embodiment, the Subnet Component 435 identifies each subnet/SVI in the Traditional Configuration 455, and generates a corresponding bridge domain in the updated configuration. This ensures that the flood domain(s) of the Updated Configuration 460 match the flood domains of the Traditional Configuration 455. Further, as discussed above, the Master Class Component 440 creates a master EPG for each of the applications/security zones in the Traditional Configuration 455. In one embodiment, creating these master classes includes assigning a unique value to each security zone, such that this value can be used to set the MSBs of each local group in order to uniquely identify the corresponding master group.

In the illustrated embodiment, the Local Class Component 445 then creates the needed local EPGs within each generated bridge domain. In an embodiment, this includes identifying, for each bridge domain, the applications or security zones that are present in the corresponding subnet in the Traditional Configuration 455. The Local Class Component 445 can then generate a local EPG (or VLAN) for each such zone. Further, in an embodiment, the Local Class Component 445 generates and assigns an identifier to each local EPG. In one embodiment, this local identifier can be used to identify the bridge domain of the group. In such an embodiment, each local EPG within a bridge domain will share the same local class, and may have different master classes. In another embodiment, each local group may have a unique identifier.

In one embodiment, the Local Class Component 445 further determines the corresponding security zone for the local group, and assigns the relevant master class. For example, when creating a local EPG for an IT application, the Local Class Component 445 can first assign a local identifier to the LSBs of the security tag, identify the value used for the IT group master class, and assign this value to the MSBs of the security tag. In the illustrated embodiment, the Security Component 450 can then generate one or more contracts between the groups in order to reflect the policies used in the Traditional Configuration 455. For example, for each policy in the Traditional Configuration 455 that applies broadly to an entire security zone, the Security Component 450 can generate a corresponding master contract. For each policy that affects particular nodes or groups within a zone, the Security Component 450 generates a corresponding local contract.

Figure 5:
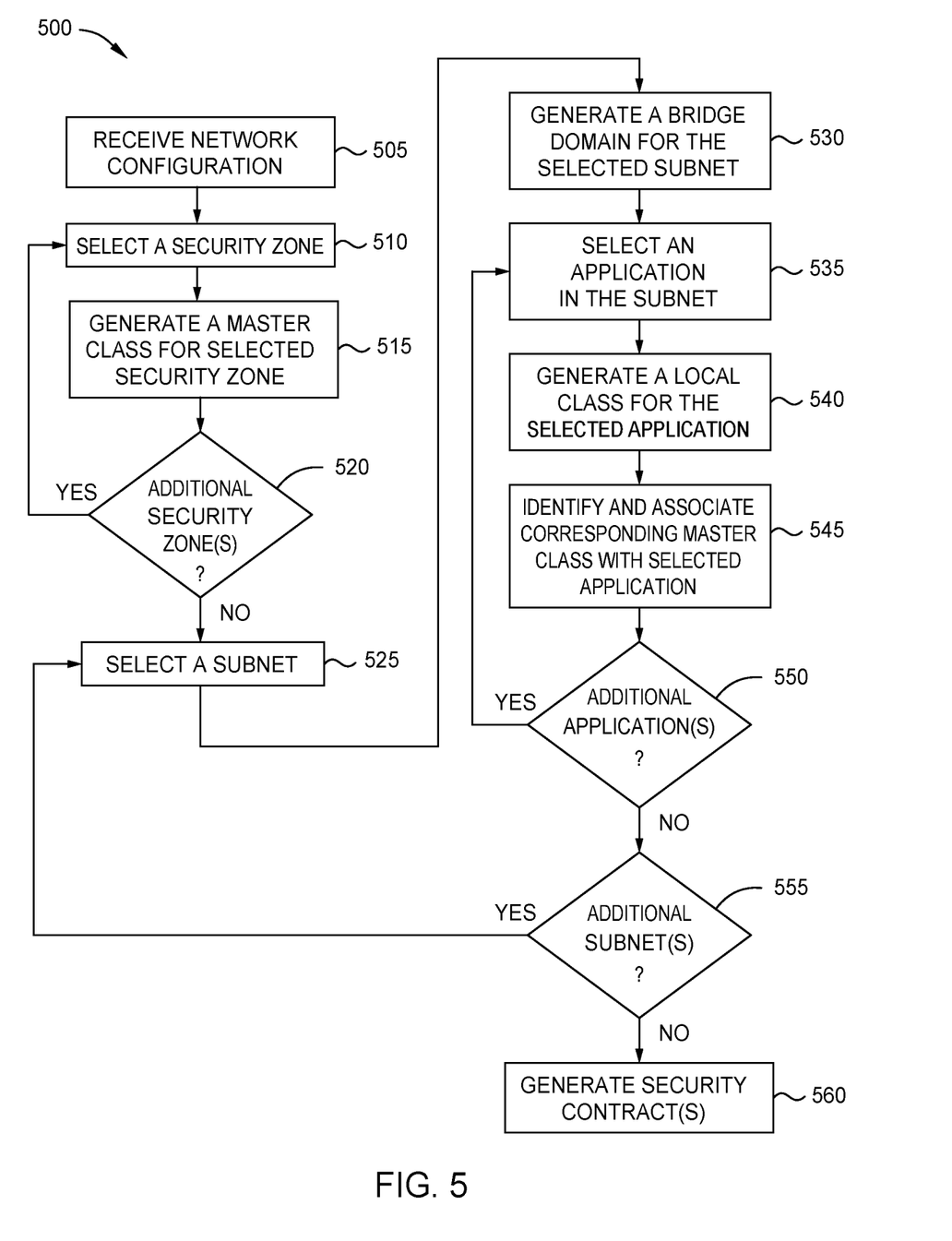
FIG. 5 is a flow diagram illustrating a method for migrating network configurations to a hierarchical SDN system, according to one embodiment disclosed herein.

FIG. 5 is a flow diagram illustrating a method 500 for migrating network configurations to a hierarchical SDN system, according to one embodiment disclosed herein. The method 500 begins at block 505, where a Configuration Application 430 receives a traditional network configuration to be migrated to an SDN system (e.g., an ACI system). At block 510, the Configuration Application 430 selects one of the security zones (also referred to as applications) included in the received configuration. The method 500 then proceeds to block 515, where the Configuration Application 430 generates a master class for the selected zone. As discussed above, in embodiments, the master class enables each node included in the security zone to inherit and be controlled by a common set of contracts or policies, regardless of the subnet to which it belongs.

At block 520, the Configuration Application 430 determines whether there is at least one additional security zone that has not yet been processed. If so, the method 500 returns to block 510. Otherwise, the method 500 continues to block 525, where the Configuration Application 430 selects one of the subnet(s) included in the received configuration. At block 530, the Configuration Application 430 generates a bridge domain for the selected subnet such that the nodes within the bridge domain share a common flood domain, in order to match the flood domain of the original subnet. The method 500 then proceeds to block 535.

At block 535, the Configuration Application 430 selects an application or security zone that is included in the selected subnet. For example, in an embodiment, the Configuration Application 430 identifies the corresponding application(s) or security zone(s) for each node in the selected subnet, in order to determine which security zones should be represented in the generated bridge domain. The Configuration Application 430 then selects one such security zone, and the method 500 continues to block 540. At block 540, the Configuration Application 430 generates a local class for the selected application. In an embodiment, as discussed above, this includes generating a local EPG (and/or a VLAN) in the generated bridge domain, and assigning a value to one or more LSBs of the corresponding security tag. This allows the system to identify the individual local group(s) associated with each communication.

The method 500 then proceeds to block 545, where the Configuration Application 430 identifies the corresponding master class for the selected application, and associates this master class to the generated local EPG. For example, if the selected application is the IT security zone, the Configuration Application 430 can assign the local EPG to the IT master class. In an embodiment, as discussed above, this involves setting one or more MSBs of the security tag of the local EPG based on the value assigned to the relevant master class.

At block 550, the Configuration Application 430 determines whether there is at least one application remaining in the selected subnet which has not yet been processed. If so, the method 500 returns to block 535. Otherwise, if the subnet has completed processing, the method 500 continues to block 555, where the Configuration Application 430 determines whether there is at least one additional subnet in the received configuration that has not yet been migrated. If so, the method 500 returns to block 525 to select the next one. Otherwise, the method 500 proceeds to block 560, where the Configuration Application 430 generates the required security contracts needed to migrate the security policies included in the received configuration. In embodiments, as discussed above, the use of hierarchical master classes can dramatically reduce the number of contracts required. The updated/migrated network configuration can then be deployed.

Figure 6:
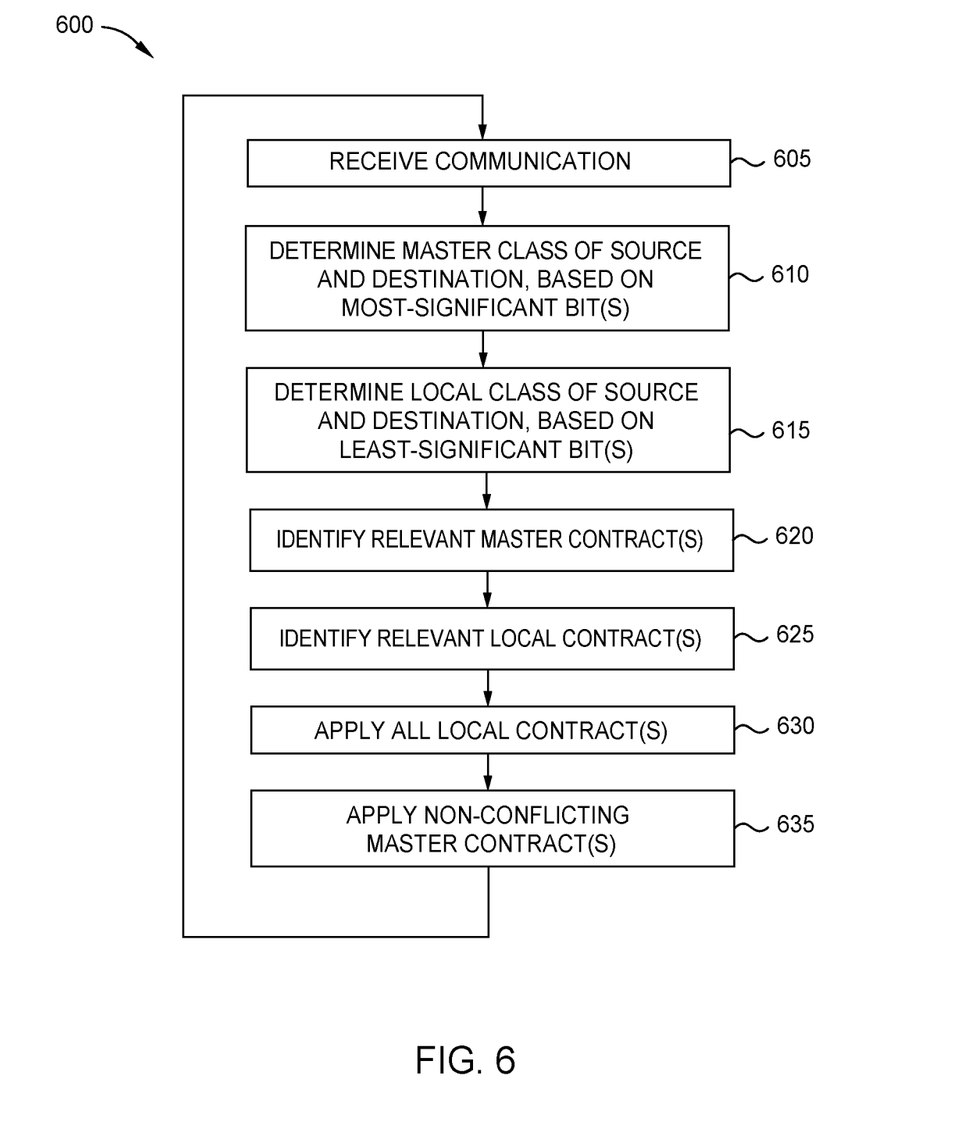
FIG. 6 is a flow diagram illustrating a method for enforcing hierarchical security policies in an SDN system, according to one embodiment disclosed herein.

FIG. 6 is a flow diagram illustrating a method 600 for enforcing hierarchical security policies in an SDN system, according to one embodiment disclosed herein. The method 600 begins at block 605, where a network node (e.g., a switch, router, gateway, or other routing or forwarding device) receives a communication (such as a packet). In an embodiment, this communication specifies a source EPG (e.g., a security tag or s class of the source node) and/or a destination EPG (e.g., a security tag of the destination node). At block 610, the Configuration Application 430 determines the mater class of the source and/or destination nodes. In one embodiment, to Configuration Application 430 does so by retrieving the specified security tag(s) in the communication, and extracting one or more MSBs from each. In an embodiment, these MSBs can be used to uniquely identify the corresponding master class for the node(s).

In various embodiments, the Configuration Application 430 can extract any portion of the security tag(s) in order to identify the master class and/or local class. That is, although the present embodiment utilizes one or more MSBs of the tag for the master class and the LSBs for the local class, other embodiments may use one or more LSBs for the master class, or one or more intermediate bits to identify the master class. The particular bit(s) to be extracted to identify a given class depends on the particular implementation and predefined definitions used.

The method 600 then continues to block 615, where the Configuration Application 430 similarly determines the local class of the source and/or destination nodes, based on the indicated security tags. In the illustrated embodiment, this is performed by extracting one or more LSBs from the tags. In some embodiments, the local class is uniquely identified by these LSBs. In one embodiment, the LSBs identify the bridge domain, and the Configuration Application 430 utilizes the MSB(s) to identify the particular local EPG. At block 620, the Configuration Application 430 identifies any master contracts that are relevant to the communication, based on the determined master class(es).

At block 625, the Configuration Application 430 similarly identifies any local contracts (or contracts that are otherwise more specifically-applied) that are relevant to the communication, based on the identified local class(es). The method 600 then proceeds to block 630, where the Configuration Application 430 applies the identified local contracts. In embodiments, these contracts generally relate to security in the network, and can include, for example, filters to be applied, whether or not communication is permitted between the classes, and the like. At block 635 the Configuration Application 430 applies any non-conflicting master contracts. That is, in the illustrated embodiments, local contracts are always applied, and master contracts are only applied to the extent that they do not conflict with any of the identified local contracts. In this way, local groups can inherit shared master policies, which allowing enforcement of more granular security policies.

Figure 7:
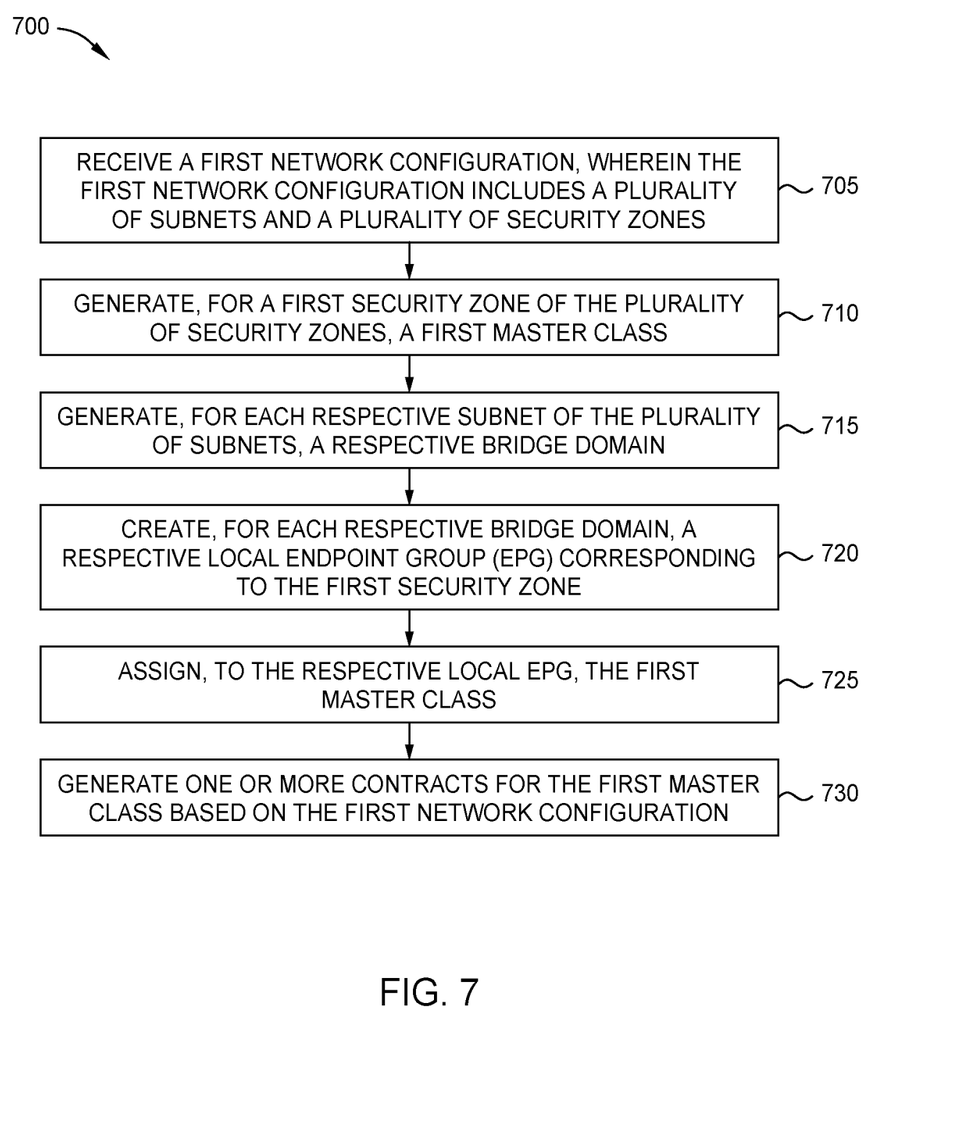
FIG. 7 is a flow diagram illustrating a method for updating network configurations, according to one embodiment disclosed herein.

FIG. 7 is a flow diagram illustrating a method 700 for updating network configurations, according to one embodiment disclosed herein. The method 700 begins at block 705, where a Configuration Application 430 receives a first network configuration, wherein the first network configuration includes a plurality of subnets and a plurality of security zones. At block 710, the Configuration Application 430 generates, for a first security zone of the plurality of security zones, a first master class. The method 700 then continues to block 715, where the Configuration Application 430 generates, for each respective subnet of the plurality of subnets, a respective bridge domain. The method 700 proceeds to block 720, where the Configuration Application 430 creates, for each respective bridge domain, a respective local endpoint group (EPG) corresponding to the first security zone. Further, at block 725, the Configuration Application 430 assigns, to the respective local EPG, the first master class. Finally, at block 730, the Configuration Application 430 generates one or more contracts for the first master class based on the first network configuration.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving a first network configuration, wherein the first network configuration includes a plurality of subnets and a plurality of security zones;
generating an updated network configuration based on the first network configuration by:
generating, for a first security zone of the plurality of security zones, a first master class,
generating, for each respective subnet of the plurality of subnets, a respective bridge domain, and
for a first bridge domain:
creating a first local endpoint group (EPG) corresponding to the first security zone,
assigning, to the first local EPG, the first master class for the first security zone, comprising setting one or more bits of a class field to a shared master value, and
assigning, to the first local EPG, a first local class for the first security zone, comprising setting one or more bits of the class field to a unique local value;
generating one or more contracts for the first master class based on the first network configuration; and
generating one or more contracts for the first local class based on the first network configuration, wherein the one or more contracts for the first master class and the one or more contracts for the first local class each apply to the first local EPG.

2. The method of claim 1, the method further comprising:
generating, for each respective security zone of the plurality of security zones, a respective master class;
for each respective bridge domain:
for each respective security zone of the plurality of security zones:
creating a respective local EPG corresponding to the respective security zone; and
assigning, to the respective local EPG, the respective master class corresponding to the respective security zone.

3. The method of claim 1, wherein assigning the first master class to the first local EPG corresponding to the first security zone causes nodes in the first local EPG corresponding to the first security zone to inherit a security configuration associated with the first security zone, such that the nodes in each local EPG associated with the first security zone share security contracts in the updated network configuration.

4. The method of claim 3, the method further comprising:
identifying a first contract associated with the first master class; and
applying the first contract to each local EPG corresponding to the first security zone.

5. The method of claim 1, the method further comprising:
assigning, to each respective local EPG corresponding to the first security zone, a respective local class, in addition to the first master class, wherein the respective local class is given priority over the first master class when identifying relevant contracts.

6. The method of claim 5, wherein assigning, to each respective local EPG corresponding to the first security zone, a respective local class comprises setting one or more bits of a class field to a unique local value, the method further comprising:
assigning, to each respective local EPG corresponding to the first security zone, the first master class, comprising setting one or more of bits of the class field to a shared master value.

7. The method of claim 5, the method further comprising:
creating a first application-specific contract for the first security zone by associating the first application-specific contract with the first master class; and
creating a first EPG-specific contract for a first local EPG corresponding to the first security zone by associating the first EPG-specific contract with a local class corresponding to the first local EPG.

8. The method of claim 7, the method further comprising:
determining that both the first application-specific contract and the first EPG-specific contract are applicable to a first data transmission from the first local EPG;
upon determining that the first application-specific contract conflicts with the first EPG-specific contract:
applying the first EPG-specific contract; and
refraining from applying the first application-specific contract.

9. A non-transitory computer-readable storage medium having computer-readable program code embodied therewith, the computer-readable program code executable by one or more computer processors to perform an operation comprising:
receiving a first network configuration, wherein the first network configuration includes a plurality of subnets and a plurality of security zones;
generating an updated network configuration based on the first network configuration by:
generating, for a first security zone of the plurality of security zones, a first master class,
generating, for each respective subnet of the plurality of subnets, a respective bridge domain, and
for a first bridge domain:
creating a first local endpoint group (EPG) corresponding to the first security zone,
assigning, to the first local EPG, the first master class for the first security zone, comprising setting one or more bits of a class field to a shared master value, and assigning, to the first local EPG, a first local class for the first security zone, comprising setting one or more bits of the class field to a unique local value;
generating one or more contracts for the first master class based on the first network configuration; and
generating one or more contracts for the first local class based on the first network configuration, wherein the one or more contracts for the first master class and the one or more contracts for the first local class each apply to the first local EPG.

10. The non-transitory computer-readable storage medium of claim 9, wherein assigning the first master class to the first local EPG corresponding to the first security zone causes nodes in the first local EPG corresponding to the first security zone to inherit a security configuration associated with the first security zone, such that the nodes in each local EPG associated with the first security zone share security contracts in the updated network configuration.

11. The non-transitory computer-readable storage medium of claim 9, the operation further comprising:
assigning, to each respective local EPG corresponding to the first security zone, a respective local class, in addition to the first master class, wherein the respective local class is given priority over the first master class when identifying relevant contracts.

12. The non-transitory computer-readable storage medium of claim 11, wherein assigning, to each respective local EPG corresponding to the first security zone, a respective local class comprises setting one or more bits of a class field to a unique local value, the operation further comprising:
assigning, to each respective local EPG corresponding to the first security zone, the first master class, comprising setting one or more of bits of the class field to a shared master value.

13. The non-transitory computer-readable storage medium of claim 11, the operation further comprising:
creating a first application-specific contract for the first security zone by associating the first application-specific contract with the first master class; and
creating a first EPG-specific contract for a first local EPG corresponding to the first security zone by associating the first EPG-specific contract with a local class corresponding to the first local EPG.

14. The non-transitory computer-readable storage medium of claim 13, the operation further comprising:
determining that both the first application-specific contract and the first EPG-specific contract are applicable to a first data transmission from the first local EPG;
upon determining that the first application-specific contract conflicts with the first EPG-specific contract:
applying the first EPG-specific contract; and
refraining from applying the first application-specific contract.

15. A system comprising:
one or more computer processors; and
a memory containing a program which when executed by the one or more computer processors performs an operation, the operation comprising:
receiving a first network configuration, wherein the first network configuration includes a plurality of subnets and a plurality of security zones;
generating an updated network configuration based on the first network configuration by:
generating, for a first security zone of the plurality of security zones, a first master class;
generating, for each respective subnet of the plurality of subnets, a respective bridge domain, and
for a first bridge domain:
creating a first local endpoint group (EPG) corresponding to the first security zone,
assigning, to the first local EPG, the first master class for the first security zone, comprising setting one or more bits of a class field to a shared master value, and
assigning, to the first local EPG, a first local class for the first security zone, comprising setting one or more bits of the class field to a unique local value;
generating one or more contracts for the first master class based on the first network configuration; and
generating one or more contracts for the first local class based on the first network configuration, wherein the one or more contracts for the first master class and the one or more contracts for the first local class each apply to the first local EPG.

16. The system of claim 15, wherein assigning the first master class to the first local EPG corresponding to the first security zone causes nodes in the first local EPG corresponding to the first security zone to inherit a security configuration associated with the first security zone, such that the nodes in each local EPG associated with the first security zone share security contracts in the updated network configuration.

17. The system of claim 15, the operation further comprising:
assigning, to each respective local EPG corresponding to the first security zone, a respective local class, in addition to the first master class, wherein the respective local class is given priority over the first master class when identifying relevant contracts.

18. The system of claim 17, wherein assigning, to each respective local EPG corresponding to the first security zone, a respective local class comprises setting one or more bits of a class field to a unique local value, value, the operation further comprising:
assigning, to each respective local EPG corresponding to the first security zone, the first master class, comprising setting one or more of bits of the class field to a shared master value.

19. The system of claim 17, the operation further comprising:
creating a first application-specific contract for the first security zone by associating the first application-specific contract with the first master class; and
creating a first EPG-specific contract for a first local EPG corresponding to the first security zone by associating the first EPG-specific contract with a local class corresponding to the first local EPG.

20. The system of claim 19, the operation further comprising:
determining that both the first application-specific contract and the first EPG-specific contract are applicable to a first data transmission from the first local EPG;
upon determining that the first application-specific contract conflicts with the first EPG-specific contract:
applying the first EPG-specific contract; and
refraining from applying the first application-specific contract.

* * * * *

UNITED STATES PATENT AND TRADEMARK OFFICE
CERTIFICATE OF CORRECTION

PATENT NO. : 11,336,694 B2
APPLICATION NO. : 16/532385
DATED : May 17, 2022
INVENTOR(S) : Gautam Venkataramanan et al.

It is certified that error appears in the above-identified patent and that said Letters Patent is hereby corrected as shown below:

In the Claims

In Column 16, Line 40 (Approx.), in Claim 18, delete "value, value," and insert -- value, --.

Signed and Sealed this
Twenty-third Day of August, 2022

Katherine Kelly Vidal
*Director of the United States Patent and Trademark Office*